United States Patent [19]

Mohsin

[11] 4,426,118
[45] Jan. 17, 1984

[54] FLUID BEARINGS

[75] Inventor: Mohamed E. Mohsin, Manchester, England

[73] Assignee: National Research Development Corporation, London, England

[21] Appl. No.: 317,857

[22] Filed: Nov. 3, 1981

Related U.S. Application Data

[63] Continuation-in-part of Ser. No. 39,440, May 15, 1979, Pat. No. 4,307,918.

[30] Foreign Application Priority Data

Nov. 7, 1980 [GB] United Kingdom ............... 8035914

[51] Int. Cl.³ .......................................... F16C 32/06
[52] U.S. Cl. .................................. 308/5 R; 384/121
[58] Field of Search ............. 308/5 R, 3 A; 384/118, 384/100, 111, 117, 122, 121

[56] References Cited

U.S. PATENT DOCUMENTS

| | | | |
|---|---|---|---|
| 3,129,037 | 4/1964 | Ott | 384/118 |
| 3,751,118 | 8/1973 | Arneson | 308/5 R |
| 4,114,959 | 9/1978 | Christ | 308/5 R |

*Primary Examiner*—Lenard A. Footland

*Attorney, Agent, or Firm*—Cushman, Darby & Cushman

[57] ABSTRACT

A fluid bearing of the type whereby a fluid film is created which separates the confronting surfaces of two bearing members in use, and in which the fluid is supplied from a recess formed in one of those surfaces. Fluid shear resistance, resulting from fluid circulation set up within the recess by the relative movement of the two bearing members, is diminished by providing the recess fluid with a circulation path whereby the effect of the circulation within the path is to set up a negative pressure gradient in the fluid lying between the leading and trailing ends of the recess and adjacent the surface of the other bearing member. The path may lie external to the recess itself, or may be created within the recess by a baffle which may be movable so that the gradient may be varied to match changes in operating conditions. The structure creating the gradient effect may be confined to divergent shaping of the walls of the circulation conduit itself, or may include means to add a component of positive drive to the circulation of fluid. Parameters required to eliminate shear resistance and to minimize the total power required to overcome fluid resistance forces in use are also disclosed.

9 Claims, 11 Drawing Figures

FLUID BEARINGS

This is a continuation-in-part of my copending application Ser. No. 39,440 filed May 15, 1979, now U.S. Pat. No. 4,307,918 issued Dec. 29, 1981, which claimed Priority based on UKPA No. 20298/78, filed May 17, 1978, the Priority of which is hereby claimed herein.

This invention relates to hydrostatic and other fluid bearings comprising two bearing members, one movable relative to the other, and in which a fluid film separates the members. In such a bearing a recess, connected in use to a pressurised supply of fluid, is formed in one of those members and the mouth of that recess confronts the surface of the second bearing member. The bearing load tends to urge the first and second members into contact with each other. However, the pressure of the fluid in the recess causes it to urge the two members apart and to fill with the film the slight gap that it has created between them. Such a bearing will be referred to as "a fluid bearing of the kind described". Suitable regulation of the supply pressure of the fluid, by known means that are no part of the present invention, may match changes of the bearing load and other relevant forces whereby to vary the thickness of the film and so maintain the bearing gap constant and the travel of the moving member true. While it is known for the stationary and movable members of such a bearing to be capable of a greater variety of relative movement, and while this invention is capable of being applied to bearings in which such greater variety of relative movement is possible, the invention will be described in relation to the linear movement of one bearing member relative to the other. The moving member may travel along a straight line, as in a typical machine tool slideway bearing for instance, or along a circular path as in a journal bearing. While the invention applies also to bearings in which the member carrying the recess is movable and the other member presenting the confronting surface is stationary, for ease of description in the remainder of this specification it will be assumed that the recessed member is the stationary one and the other member is moving, and the terms "leading" and "trailing" when applied to parts of the stationary member relate to the order in which the respective parts are passed by any point of the moving member in the course of its movement, the leading part being passed first.

In a typical hydrostatic bearing recess having enclosed ends and a single inlet for pressure fluid, and from which fluid can escape only by way of the bearing gap, it is well known that contact between the fluid and that part of the surface of the moving member confronting the recess mouth tends to set up a circulation of fluid within the recess of the kind known as Couette-type flow: the layers of fluid closest to the moving surface tend to move with it while the more remote layers closer to the base of the recess will move in the opposite direction, creating shear at the interface between the oppositely-moving layers and thus heat. One means towards solving this problem is described in the specification of pending U.K. patent application No. 20298/78. This comprises providing the recess with means that guide the circulatory movement of the fluid within it, so that contact between oppositely-moving layers of fluid occurs little if at all. The guide means proposed in that specification are either external to the recess, comprising a conduit with an inlet in the trailing end wall of the recess and an outlet which discharges into the leading end wall, or internal to the recess comprising a baffle located roughly at mid-height between the mouth and the base of the recess, with clearance from the recess walls at the trailing and leading ends: in the latter case the baffle acts as an island in the middle of the circulatory flow.

The guide means proposed in UKPA No. 20298/78 and just described have had some success in overcoming the inter-layer friction problem associated with Couette-type flow for whose solution they were proposed. The present invention arises from my discovery that they can also contribute to overcoming a different frictional problem. This is illustrated by FIGS. 1 and 2 of the accompanying drawings, each of which is a diagrammatic lengthwise section through a bearing taken in a plane lying parallel to the direction of motion of the moving member: these two figures also contain related graphs. Both figures show a bearing comprising a moving member 1, moving in use at velocity V in the direction of the arrow shown relative to a stationary member 3. A recess, fed with fluid from a pressurised supply by way of a conduit 2, is formed in member 3 and is bounded by surfaces including base 4, leading end wall 5 and trailing end wall 6. FIG. 1 illustrates the traditional closed-ended recess in which contact between the recess fluid and the surface of moving member 1 sets up a Couette-type movement of that fluid, as described above and as indicated by arrow 7. Graph A indicates the distribution of fluid velocity over the depth of the recess, being high in one sense adjacent member 1 but changing to a velocity in the opposite sense before reaching zero adjacent the base 4. Graph B denotes the distribution of fluid pressure over the length of the recess, rising linearly from value $p_2$ at the leading end wall 5 to $p_1$ at the trailing end wall 6. Graph C represents the distribution of shear stress within the fluid over the height of the bearing: this changes linearly from a relatively high value in one sense adjacent the movable member 1 to a lesser value of opposite sign adjacent base 4. For the purposes of the present invention Graph C represents a most relevant quantity, since shear resistance is a function of shear stress and the total shear resistance experienced by the fluid within the recess is a factor of the total resistance that must be overcome to drive the movable member of the bearing relative to the stationary one.

The shear resistance of the fluid at its interface with the surface of movable member 1 constitutes a major proportion of the total resistance, and is thus a major factor in determining the power requirements of the machine tool or other device of which the bearing is a component. As Graph C of FIG. 1 shows, the distribution of shear stress over the depth of the recess is such that the function has maximum value at the interface with the moving surface.

FIG. 2 illustrates the modified form of bearing recess, already referred to, which has been proposed to help diminish the generation of heat within the recess due to contact and shearing between adjacent and oppositely-moving streams of fluid. FIG. 2 shows a conduit 8, substantially constant in cross-section throughout its length, connecting the trailing end wall 6 of the recess to the leading end wall 5. In use the drag exerted upon the recess fluid by its contact with the surface of movable member 1 now causes a continuous circulation of fluid along the length of the recess in the direction from the leading end wall 5 to the trailing end wall 6, then around the conduit 8 and so back to leading end wall 5.

Graph D illustrates the typical distribution of fluid velocity over the constant depth $h_r$ of such a recess, falling linearly from a maximum adjacent the moving member 1 to zero adjacent the recess base 4. Provided such a velocity distribution is attained, it of course avoids friction between adjacent and oppositely-moving streams of fluid travelling lengthwise within the recess, since in use all the fluid in the recess will be moving in the same lengthwise direction.

The present invention arises out of further analysis of the kind of construction shown in FIG. 2, and in particular out of the consideration of two relevant facts. Firstly, as shown in Graph E of FIG. 2, the fluid pressure within the recess will be constant during steady state conditions in use, and therefore $p_2$ will equal $p_1$ and the pressure gradient $dp/dx$ will be zero. Secondly, and as a consequence of that, the shear stress within the recess fluid will tend like the pressure to be constant over the entire depth of the recess, as indicated in Graph F, with a much lower value adjacent the moving surface than is indicated by Graph C for the Couette-type but otherwise comparable recess illustrated in FIG. 1.

The present invention arises from appreciating that by further modifying the pressure distribution within the recess that shear stress can be reduced further, possibly to zero. According to the invention the recess of a fluid bearing of the kind described is provided with a circulation path whereby in use the fluid may circulate in a plane parallel to the relative motion of the two bearing members, and in which the circulatory path is so defined as in use to set up a negative pressure gradient over at least part of the length of the recess between its leading and trailing ends, whereby to depress shear resistance in the fluid adjacent the relatively-moving bearing surface to a lower value than would obtain if the pressure gradient between the leading and trailing ends were uniformly zero.

Part of the circulation path may lie external to the recess, for instance comprising a conduit with an inlet in the trailing end wall of the recess and discharging back into the recess by means of an outlet located in the leading wall; as an alternative the circulation may take place entirely within the recess and the path may be defined by a baffle mounted within the recess and extending its full width, and acting as an island around which the circulatory flow takes place: in this case direction of flow between the baffle and the moving surface will in use be parallel to and in the same sense as that movement, whereas the flow in the return part of the path between the baffle and the base of the recess will be in the opposite sense.

The negative pressure gradient may be created, or at least enhanced, by driving the circulation for instance by a pump, so that the rate of circulation is greater than would result only from the drag of the moving bearing member upon the recess fluid. Preferably however the circulation is driven only by the drag of the moving surface upon the recess fluid, and the rate of circulation necessary to set up the negative gradient is brought about by shaping the defining surfaces of the return part of the circulation path as its leads from the trailing end of the recess to the leading end so that it increases in cross-sectional area. In particular it may over part of its length be smoothly divergent in shape so that the cross-sectional area expands steadily. Alternatively, or in addition, the defining surfaces of the recess may be arranged so that the cross-section of the effective passage through which the fluid moves on the "forward" or "working" part of its circulation path—that is to say, as it moves from the leading end wall of the recess towards the trailling end wall—progressively diminishes. In this case one of the bounding surfaces of this passage is of course the confronting surface of the moving member. Such variation in cross-sectional area of the recirculation path may be such that shear resistance in the fluid adjacent the relatively-moving surface may be reduced substantially to zero at a predetermined relative velocity of the two bearing members; in particular the bearing may be designed and used so that at that relative velocity the value of the function $\psi$ (to be defined) is not less than 0.563.

It is also within the scope of the invention that the degree of such variation in area may itself be variable—for instance by adjusting the setting of the baffle where recirculation takes place entirely within the recess—so that the characteristics of the recirculatory flow may, for instance, be changed to match changes in use of the relative velocity of the bearing members.

It is again within the scope of the invention that a bearing should be designed and used not merely so that shear resistance in the fluid adjacent the moving surface is reduced to zero or nearly so, but so that the total power required to drive the moving member relative to the stationary one is minimised. In particular the bearing may be designed and used so that the function $\psi$ has a value of about $\frac{2}{3}$ and the function $\theta$ (to be defined) a value of 1.5.

The invention is also stated by the Claims at the end of this specification, the contents of which are to be read as forming part of the disclosure of the specification, and the invention will now be described, by way of example, with reference to the glossary of terms at the end of this specification and to the further accompanying drawings in which:

Figure 1:
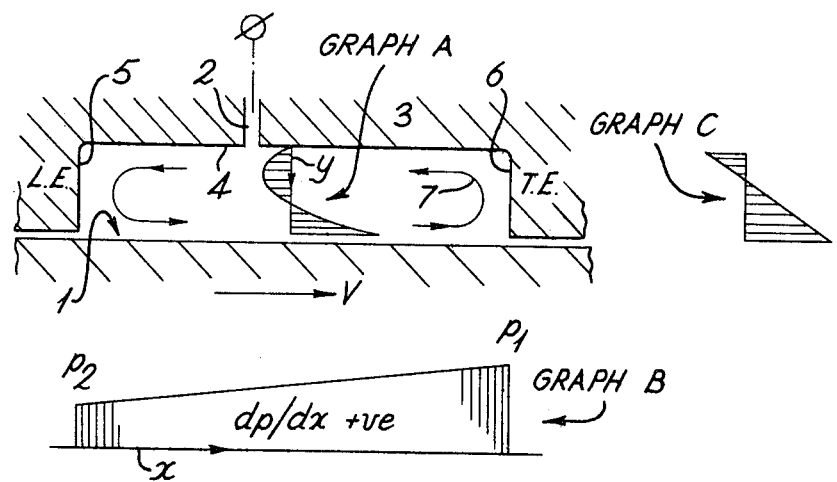
FIGS. 1 and 2 show prior art fluid bearings.
Figure 2:
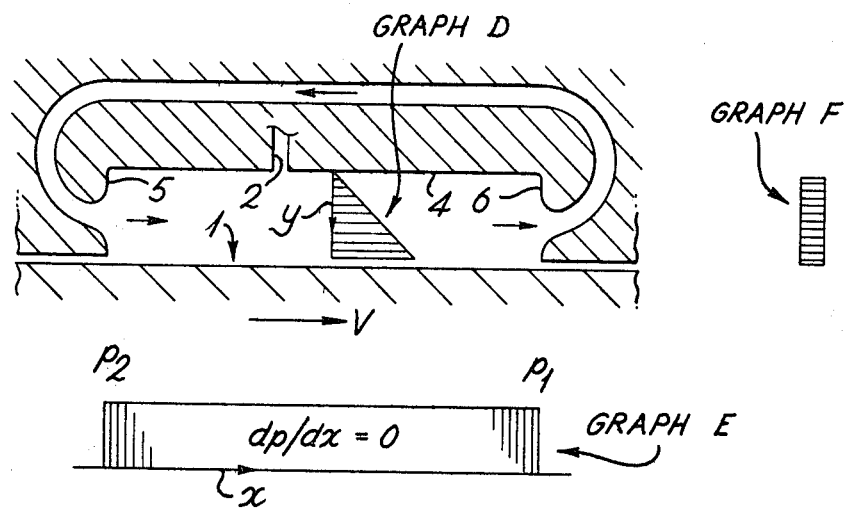
Figure 3:
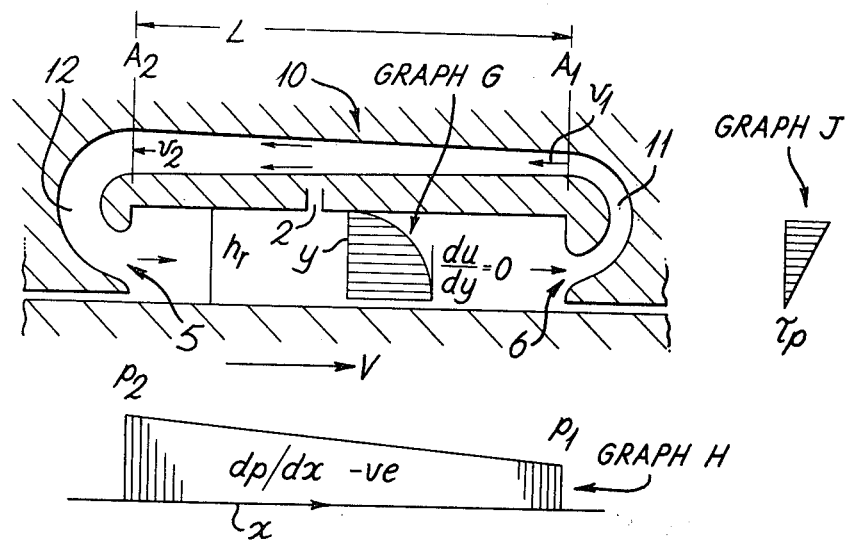
FIG. 3 is a diagrammatic longitudinal section through a bearing according to the invention, with associated graphs.

FIG. 3 shows a bearing recess similar to that shown in FIGS. 1 and 2 but the conduit 10 leading from the trailing end wall 6 to the leading end wall 5 is not a structure of constant cross-sectional area like the conduit 8 shown in FIG. 2. Instead the initial part 11 of the conduit has a cross-section of area $A_1$ and the end part 12 has a greater cross-section of area $A_2$, and between these two parts over a length L corresponding to that of the recess itself the cross-section area of the conduit expands linearly from $A_1$ to $A_2$. The theory of operation of a bearing containing such a recess will be explained in more detail later, but provided flow in the conduit 10 obeys Bernoulli's equation then it is typically found that the distribution of fluid velocity over the depth of the recess conforms to the pattern shown in Graph G, that the distribution of fluid pressure over the length of the recess corresponds with Graph H, and provided areas $A_1$ and $A_2$ and other key quantities are properly matched (as will be explained) then a typical distribution of shear stress within the fluid over the depth of the recess can become as shown in Graph J. As will readily be seen from this graph the shear stress has zero value adjacent the relatively-moving surface, with advantages which have already been summarised.

Figure 4:
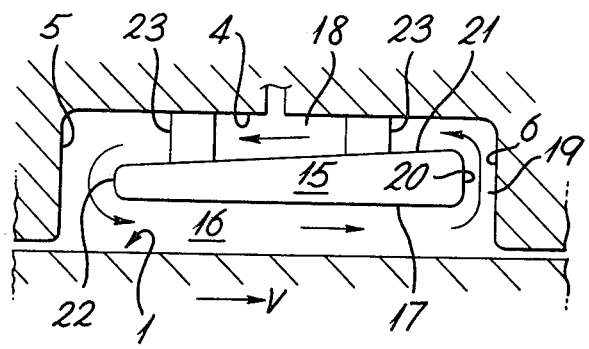
FIG. 4 is a similar section through another bearing.

In the bearing shown in FIG. 4 there is no external recirculatiion conduit 8 or 10. Instead the circulation path lies entirely within the recess: structure in the form of a baffle 15, spanning the entire transverse distance between one side wall 16 of the recess and the other side wall which lies in front of the plane of the section, forms an island within the recess around which the circulatory flow takes place. The lower face 17 of the baffle lies parallel to the surface of the bearing member 1, so that these two surfaces define between themselves a parallel-sided gap in which the recess fluid moves over that part of its circulatory path when it is travelling within the recess in the same direction (2) as the moving member 1. On the "return" part 18 of the path, which the fluid reaches by passing through a gap 19 between an end wall 20 of baffle 15 and the trailing end wall 6 of the recess, the fluid travels down a conduit of progressively increasing cross-sectional area defined between the base 4 of the recess and the angled surface 21 of baffle 15. At the end of this conduit the fluid enters the working part of its cycle again by passing through the gap between end wall 22 of baffle 15 and the leading end wall 5 of the recess. Baffle 15 is supported by pillars 23 which are preferably streamlined to minimise resistance to fluid flow.

Figure 5:
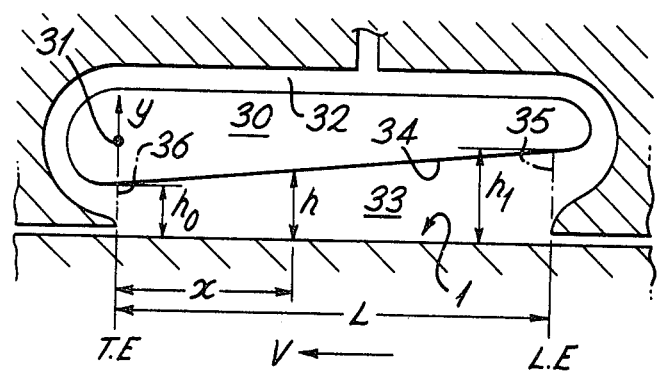
FIGS. 5 and 6 show similar sections through yet another bearing, having a movable baffle shown in two different positions in the two Figures.
Figure 6:
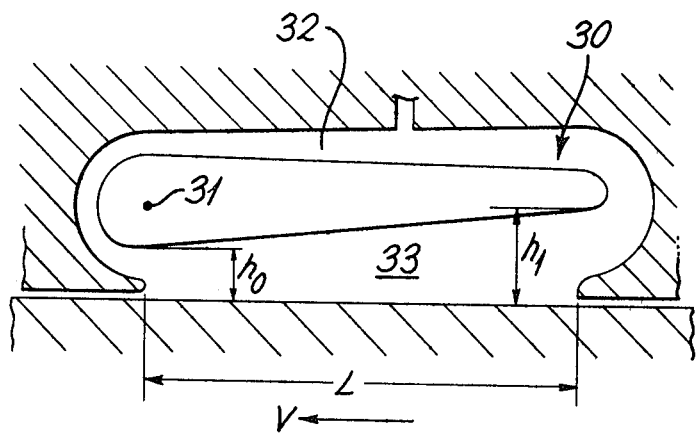

The bearing shown in FIGS. 5 and 6 is similar to that of FIG. 4 in that recirculation takes place within the recess and is guided by a baffle rather than an external conduit. However, the bearing of FIGS. 5 and 6 differs in that the baffle 30 is pivotable about a transverse axis 31. In one extreme position of the baffle, as shown in FIG. 5, the "return" part 32 of the circulation path is of constant cross-section while the "working" part 33, defined between the surface of member 1 and the sloping lower face 34 of the baffle, has a cross-sectional area that diminishes steadily from the leading end 35 of the recess to the trailing end 36. FIG. 6 shows baffle 30 after it has been pivoted clockwise about axis 31: now the cross-section of the "return" part 32 of the path widens gently but progressively along its length, and the "working" part 33 of the path converges less sharply between the leading and trailing ends of the recess. Further pivoting of baffle 30 about axis 31 would of course lead to a configuration substantially as shown in FIG. 4, with the working part 33 of the path parallel-sided and with maximum divergence of the "return" part 32. Convergence of the "working" part of the cycle (as illustrated in FIGS. 5 and 6) is capable of generating the necessary negative gradient between the leading and trailing ends of the recess, whether by itself (as in FIG. 5, where the cross-section of the "return" part is constant) or in combination with a divergent return path as in FIG. 6: some theory on this variant of the invention is to follow. The facility to rotate baffle 30 about axis 31, by means which are not shown but which could for instance be controlled by servo motors responsive to changes in operating conditions, could enable the configuration of the recirculation path to vary to respond to those changes.

Figure 7:
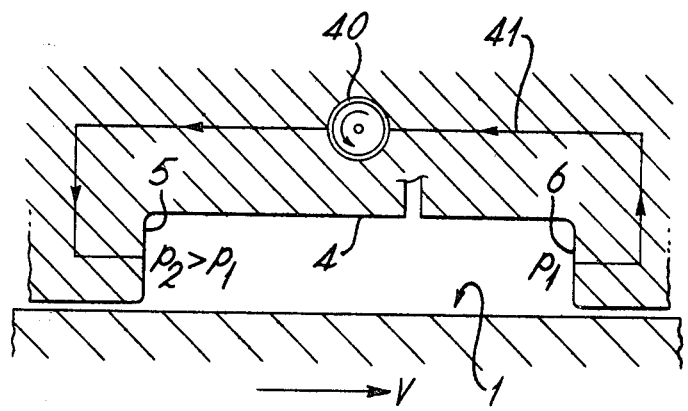
FIG. 7 is a similar section through yet another bearing.

FIG. 7 shows another version of the invention in which the structure to achieve the necessary negative pressure gradient along the length of the recess is a pump 40 located in a conduit 41 leading from the trailing end wall 6 of the recess to the leading end wall 5. Pump 40, like the setting of baffle 30 about axis 31 just described, could be servo-controlled so that its delivery changed automatically to match changes in operating conditions.

The following theoretical analysis applies primarily to the version of the invention shown in FIG. 3 of the drawings, but is clearly adaptable to the other versions.

If conduit 10 is designed in such a manner that Bernoulli's equation applies, then $$\left(\frac{p_1}{\rho}\right) + \left(\frac{v_1^2}{2}\right) = \left(\frac{p_2}{\rho}\right) + \left(\frac{v_2^2}{2}\right) \quad (1)$$

or, $$(p_2 - p_1) = \left(\frac{\rho}{2}\right)(v_1^2 - v_2^2) \quad (2)$$

The velocity profile for longitudinal flow in the recess, that is to say the longitudinal velocity u of a particle of fluid at co-ordinate (x,y), is $$U = \left(\frac{y}{h}\right)\left(V - \left(\frac{h^2}{2\mu}\right)\left(1 - \frac{y}{h}\right)\frac{dp}{dx}\right) \quad (3)$$

Thus the shear stress at the same co-ordinates within the fluid is:

$$\tau_y = \mu \cdot \frac{du}{dy} = \mu\left(\frac{V}{h}\right) - \left(\frac{h}{2}\right)\left(1 - \frac{2y}{h}\right)\frac{dp}{dx} \quad (4)$$

and from equation (3), since $$\frac{dp}{dx} = -\frac{(p_2 - p_1)}{L}$$

by intergration then $$Q = b\left(\left(\frac{Vh_r}{2}\right) + \left(\frac{h_r^3}{12\mu L}\right)(p_2 - p_1)\right) \quad (5)$$

By integration of equation (4) the total shear resistance offered by the recess fluid at its interface with the surface of movable member 1 is given by $$\tau_p = \mu \cdot \frac{V}{h} - \frac{h_r}{2} \cdot (p_2 - p_1) \cdot L \quad (6)$$

$$= \left(\mu \cdot \frac{V}{h_r}\right)(1 - \theta) \quad (7)$$

where $\theta$ equals the ratio of shear due to pressure flow divided by shear drag flow, and equals $$\frac{h_r}{2} \cdot \frac{(p_2 - p_1)}{L \cdot \frac{\mu V}{h_r}} \tag{8}$$

From equation (7) it is clear that $\tau_p = 0$ when $\theta = 1$, and also from equations (2) and (8) it is clear that $$\theta = \left(\frac{h_r^2}{2\mu VL}\right) \cdot \frac{\rho}{2} \cdot (v_1^2 - v_2^2) \tag{9}$$

and that $$(p_2 - p_1) = \theta \cdot \left(\frac{2\mu VL}{h_r^2}\right) \tag{10}$$

From equations (5) and (10) it is possible to construct an equation of the form:

$$\theta = \psi \left(1 + \frac{\theta}{3}\right)^2 \tag{11}$$

where $$\psi = R_e \cdot \left(\frac{h_r^3 \cdot b^2}{16LA_1^2}\right)\left(1 - \frac{A_1}{A_2}\right)^2 \tag{12}$$

Figure 8:
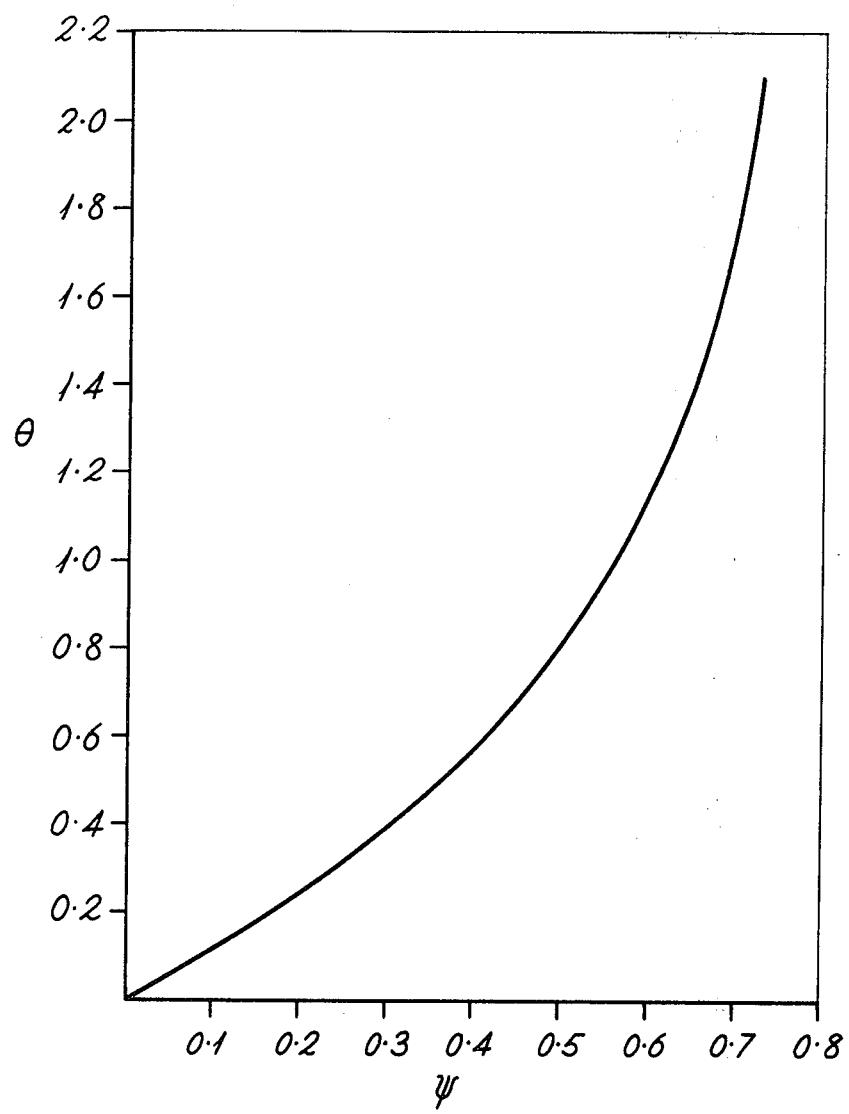
FIGS. 8 and 9 are graphs.

The shear resistance on the surface of the moving member 1 will vanish when $\theta = 1$ or, from equations (11) and (12), when $$\psi = 0.563 \tag{13}$$

which shows that the theoretical conditions for the disappearance of shear resistance at the moving surface can be predicted provided the principal dimensions of the recess and the Reynolds number of the fluid are known, the latter term of course including as a sub-term the relative velocity of the bearing members. FIG. 8 is a graph showing a plot of $\theta$ against $\psi$ for a typical fixed-geometry bearing according to the present invention, for instance as shown in FIG. 3 or FIG. 4.

So far the analysis has concentrated upon the shear resistance of the recess fluid at its interface with the moving surface and the aim of reducing this resistance if possible to zero, in order to economise on the power required to drive the moving member relative to the stationary one. This however is a simplified approach. The invention relates more fundamentally to the total power required to overcome the resistance which the fluid inside the recess offers to the movement of the movable member. That total power comprises two parts. One of these parts, which will be denoted by the symbol $P_\theta$, represents the power required to overcome the friction of the recess fluid against the confronting surface of the adjacent member and does indeed depend upon the value of the shear resistance $\tau_p$ which can be obtained from equation (6) as already indicated. It may be shown that:

$$P_f = \tau_p \cdot L \cdot b \cdot V = \left(\frac{\mu V^2}{h_r}\right) L \cdot b \cdot (1 - \theta) \tag{14}$$

The other part of the total power required to move the two members relative to each other represents that power required to create the negative pressure differential $(p_2 - p_1)$ across the length L of the recess and the resulting pressure flow. This power, which will be represented by the symbol $P_p$, may be derived from the equation $$P_p = \frac{(p_2 - p_1)^2}{R_r} \tag{15}$$

and because $$R_r = \frac{12\mu L}{h_r^3 \cdot b} \tag{16}$$

then by substituting in equation (10) it may be shown that $$P_p = \tfrac{1}{3}\left(\frac{\mu V^2}{h_r}\right) L \cdot b \cdot \theta^2 \tag{17}$$

Hence the total power $P_t$ required by the system, neglecting the relatively small power needed to overcome frictional resistance to the movement of the recess fluid around its circulatory path, will equal $$P_f + P_p = \left(\frac{\mu V^2}{h_r}\right) \cdot L \cdot b \cdot \left(1 - \theta + \frac{\theta^2}{3}\right) \tag{18}$$

Figure 9:
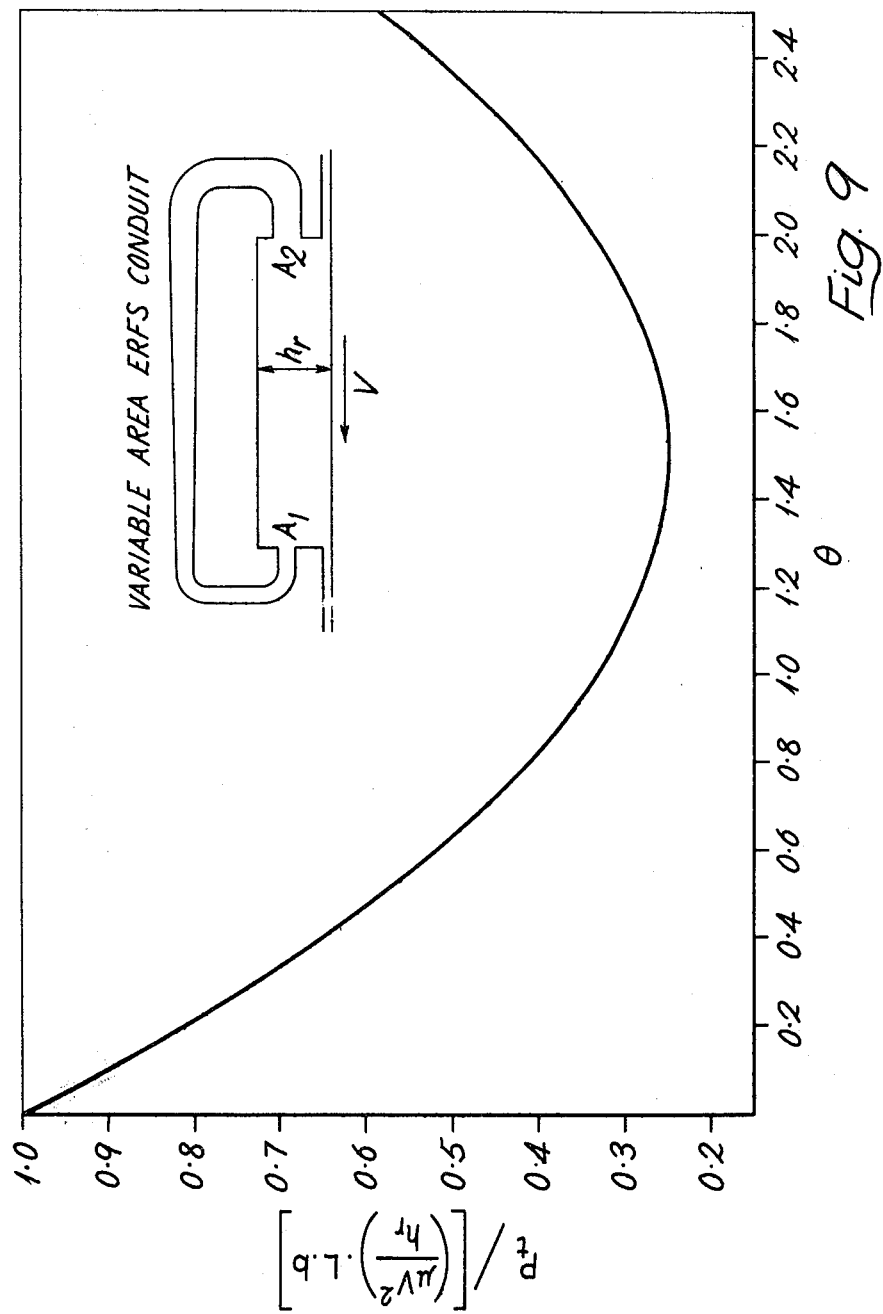

FIG. 9 shows the non-dimensional power $$\frac{P_t}{\left(\frac{\mu V^2}{h_r}\right) \cdot Lb}$$

plotted against the value of $\theta$. Clearly the minimum value of this power occurs at about $\theta = 1.5$ which, from FIG. 8, is attained at $\psi$ equals about $\tfrac{2}{3}$, which it will be noted is nearly 20% greater than the value (0.563) at which zero shear resistance at the interface between the recess fluid and the surface of the movable member is first attained. This indicates that while substantial benefit according to the invention is obtained by working the bearing at a value of $\psi$ which reduces shear resistance at the fluid/moving surface interface to a low value or just to zero greater benefit is obtained by operating at $\theta = 1.5$ and $\psi = \tfrac{2}{3}$ so as to minimise the total power $P_t$ that is required.

If the recess is made convergent in the direction of the velocity of the moving surface, as shown for instance in FIGS. 5 and 6, then this convergence will in itself produce a negative pressure gradient within the recess according to the invention and lead to beneficial results, in addition to further benefits according to the invention resulting from a divergent recirculation path, such a path being shown in FIG. 6 but not in FIG. 5. By analysis conducted on lines comparable with those that have been applied to the other embodiments of the invention already described, it may be shown that the convergent part 33 of the circulation path illustrated in FIG. 5 will give rise to a pressure gradient dp/dx equal to:

$$6\mu V \frac{\left\{H - h_0\left(1 + \frac{mx}{L}\right)\right\}}{h_0^3 \cdot \left(1 + \frac{mx}{L}\right)^3} \quad (19)$$

when the two members of the bearing are moved relative to each other at velocity V. It will be appreciated that this typically indicates a gradient that is of negative value over part of the length of the recess and zero and/or positive over the remainder, because evaluation of function (19) shows that where $$\frac{x}{L} = \frac{1}{m}\left[\frac{H}{h_0} - 1\right]$$

dp/dx equals zero. Wherever x/L has a lower value dp/dx will be positive, and wherever x/L has a higher value dp/dx will be negative.

Figure 10:
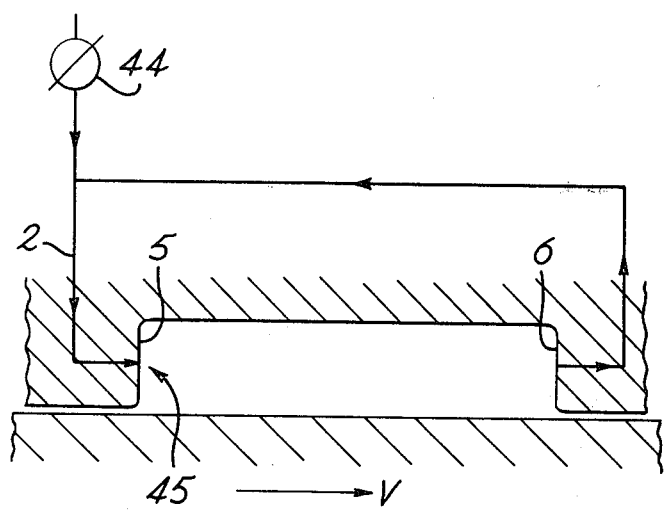
FIGS. 10 and 11 are diagrammatic longitudinal sections through further bearings.
Figure 11:
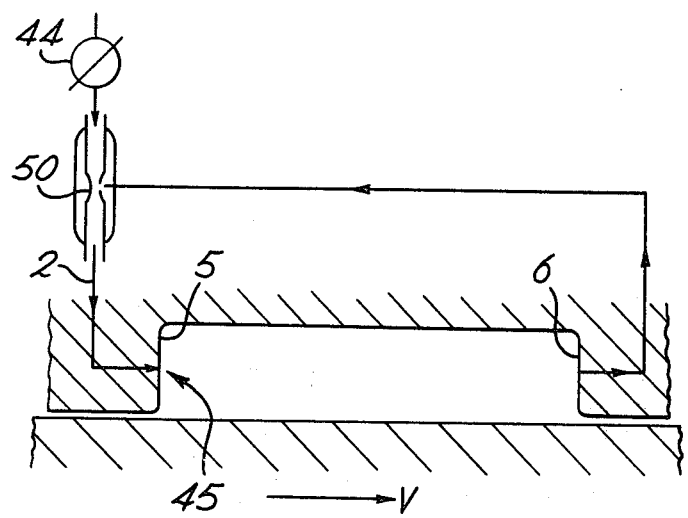

When the pressurised supply of fluid to the bearing has a high rate of flow, achievement of the necessary pressure gradient can be made easier, as illustrated in FIG. 10, by locating the port 45 (by which fluid enters the bearing recess from supply source 44) either in or very close to the leading end wall 5. Yet another way of achieving a strong negative pressure gradient is illustrated in FIG. 11 where structure in the form of a venturi-type injector 50 is placed in the supply line 2 as close as possible to end wall 5, the low pressure point of the injector being connected by conduit 41 to the port in trailing end wall 6 so as to draw fluid along that conduit. The action of injector 50 is thus comparable with that of pump 40 of FIG. 7. Like that pump, the injector 50 could also be servo-controlled so that the created negative pressure gradient could be varied to match changes in operating conditions.

Whilst as has previously been said the invention has been described with reference only to certain kinds of hydrostatic bearing, it applies to other bearings in which fluid films are set up. For instance, tilted-pad hydrodynamic bearings, and the sliding slippers of swash-plate pumps.

GLOSSARY $A_1$ cross-sectional area of return part of circulation path at inlet end - FIGS. 3, 6.
$A_2$ cross-sectional area of return part of circulation path at outlet end - FIGS. 3, 6.
b  recess width.
h  recess depth as at co-ordinate x.
$h_r$ constant recess depth, as shown in FIGS. 3, 7.
$h_0$ depth of working part of circulation path at trailing end of recess - FIG. 5.
$h_1$ depth of working part of circulation path at leading end of recess - FIG. 5.
H  recess depth at x co-ordinate where maximum pressure exists.
L  recess length.

GLOSSARY-continued $m = \left(\frac{h_0}{h_1} - 1\right)$ p   pressure.
$p_1$  pressure at trailing end of recess.
$p_2$  pressure at leading end of recess.
$p_f$  power required to overcome fluid friction resistance to movement of moving member.
$p_p$  power required to create negative pressure gradient across length of recess.
Q   rate of fluid flow across recess. (n.b. the quantity of fluid that exhausts through the bearing gap is typically small, so Q very nearly represents the rate of circulatory flow across the recess.)
$R_e$  Reynolds number of fluid.
u   velocity of fluid at chosen co-ordinate with recess.
V   velocity of surface of moving bearing member.
$v_1$  velocity of fluid in return part of circulation path at cross-section $A_1$.
$v_2$  velocity of fluid in return part of circulation path at cross-section $A_2$.
x   length co-ordinate of recess, arrow indicates sense of increasing value.
y   depth co-ordinate of recess, arrow indicates sense of increasing value.
θ   ratio of pressure flow shear to drag shear.
μ   absolute viscosity of recess fluid.
ρ   mass density of recess fluid.
$\tau_y$  fluid shear stress at given y- co-ordinate.
$\tau_p$  shear stress at fluid/moving surface interface when recess is of constant depth and return part of circulation path diverges, as in FIG. 3.
ψ   non-dimensional factor, defined in specification.

I claim:
1. A fluid bearing comprising:
first and second bearing members, adapted for relative movement relative the one to the other and separated by a fluid film in use;
a recess formed in said first bearing member and adapted for connection in use to a pressurized supply of fluid; said recess presenting leading and trailing ends relative to said relative movement, and also presenting a mouth region confronting the surface of said second bearing member;
means defining a circulation path including a conduit defined by bounding walls, an inlet to said conduit located in proximity to said mouth region and to said trailing end of said recess, and an outlet from said conduit into said recess located in proximity to said mouth region and to said leading end of said recess, whereby in use said fluid may circulate from said mouth region through said inlet and said conduit and back through said outlet into said mouth region;
and pressure-enhancing means included in said conduit and adapted in use to interact with said circulating fluid whereby to cause the pressure of said fluid at said outlet to be higher than said pressure of said fluid at said inlet.

2. A fluid bearing according to claim 1 in which at least some of said circulation takes places within said recess and said structure of said circulation path includes a baffle mounted within said recess, said baffle extending the full width of said recess and acting as an island around which said fluid circulates.

3. A fluid bearing according to claim 2 in which said baffle is movable whereby the characteristics of said recirculation path may be varied to match changes in operating conditions.

4. A fluid bearing according to claim 1 in which said structure of said circulation path includes means for positively driving said fluid flow within said circulation path, so that the rate of said circulation is greater than would result only from the drag of said relatively-moving bearing member upon said fluid within said recess.

5. A fluid bearing as claimed in claim 1 in which said bounding walls of said conduit constitute said pressure-enhancing means, said bounding walls being of smoothly divergent shape over at least part of the length of said conduit between said inlet and said outlet.

6. A method of operating a fluid bearing according to claim 1 in which shear resistance in said fluid within said recess and adjacent the surface of said second bearing member is reduced substantially to zero.

7. A method of operating a fluid bearing according to claim 6 in which the value of the function $\psi$, as defined in the specification, is not less than about 0.563.

8. A method of operating a fluid bearing according to claim 7, in which the function $\psi$ has a value of about $\frac{2}{3}$ and the function $\theta$, as defined in the specification, has a value of about 1.5.

9. A fluid bearing as claimed in claim 1 in which a leading end wall defines said leading ends of said recess; a trailing end wall defines said trailing end of said recess; said conduit lying external to said recess; said inlet being formed in said trailing end wall and said outlet being formed in said leading end wall.

* * * * *